US009983096B2

(12) United States Patent
Martucci et al.

(10) Patent No.: US 9,983,096 B2
(45) Date of Patent: May 29, 2018

(54) FUEL METERING VALVE ACTUATOR INITIATED BUILT IN TEST

(71) Applicant: United Technologies Corporation, Hartford, CT (US)

(72) Inventors: Angelo Martucci, East Hartford, CT (US); William Donat, Manchester, CT (US); Amy R. Grace, Eillington, CT (US); Thomas A. Bush, Vernon Rockville, CT (US); Eric Nelson Hettler, Rochester, NY (US); Kevin Patrick McCormick, Auburn, NY (US)

(73) Assignee: United Technologies Corporation, Farmington, CT (US)

( * ) Notice: Subject to any disclaimer, the term of this patent is extended or adjusted under 35 U.S.C. 154(b) by 377 days.

(21) Appl. No.: 15/017,138

(22) Filed: Feb. 5, 2016

(65) Prior Publication Data
US 2017/0227424 A1    Aug. 10, 2017

(51) Int. Cl.
*G01M 15/14* (2006.01)
*F02C 9/26* (2006.01)
*F01D 21/00* (2006.01)

(52) U.S. Cl.
CPC ........... *G01M 15/14* (2013.01); *F01D 21/003* (2013.01); *F02C 9/263* (2013.01)

(58) Field of Classification Search
CPC ........ G01M 15/14; F01D 21/003; F02C 9/263
See application file for complete search history.

(56) References Cited

U.S. PATENT DOCUMENTS

| 8,720,201 B2 | 5/2014 | Chapski |
| 2007/0144246 A1 | 6/2007 | Flint |
| 2012/0130587 A1* | 5/2012 | Chapski .................. F02C 9/263 701/34.4 |
| 2013/0139520 A1 | 6/2013 | Masse |

OTHER PUBLICATIONS

EP Search Report dated Sep. 22, 2017 in EP Application No. 17154659.1.

* cited by examiner

*Primary Examiner* — Yuen H Wong
(74) *Attorney, Agent, or Firm* — Snell & Wilmer, L.L.P.

(57) ABSTRACT

Systems and methods for monitoring fuel actuation system health are described herein. A method for monitoring fuel actuation system health may comprise: moving a metering valve from a first position to a second position; detecting a first travel distance of the metering valve; storing the first travel distance of the metering valve to memory to generate a first travel distance history; and determining a level of degradation of the fuel actuation system based on at least the first travel distance history.

12 Claims, 6 Drawing Sheets

FUEL METERING VALVE ACTUATOR INITIATED BUILT IN TEST

FIELD

This disclosure relates generally to gas turbine engines, and more particularly to systems and methods for monitoring the health of fuel actuation systems.

BACKGROUND

Engine components and fittings may be subjected to relatively high temperatures. Once subjected to excessive heating, fuel may undergo coking. Coking may cause solid deposits to form within fuel flow paths, causing undesirable effects such as blocked passageways and filters. Furthermore, excessive heating, cyclic loading, and other harsh conditions of engine components may lead to degradation of component health. Accordingly, response time of fuel actuation components may retard beyond desirable limits.

SUMMARY

Systems and methods for monitoring the health of fuel actuation systems are described herein, in accordance with various embodiments. A method for monitoring fuel actuation system health may comprise: moving a metering valve from a first position to a second position; detecting a first travel distance of the metering valve; storing the first travel distance of the metering valve to a memory to generate a first travel distance history; and determining a level of degradation of a fuel actuation system based on at least the first travel distance history.

In various embodiments, the method may further comprise: moving the metering valve from the second position to a third position; detecting a second travel distance of the metering valve; storing the second travel distance of the metering valve to the memory to generate a second travel distance history; determining a level of degradation of the fuel actuation system based on at least one of the first travel distance history and the second travel distance history; and outputting a signal to indicate the level of degradation. The method may further comprise: detecting at least one of a temperature of a fuel or a pressure of the fuel; and storing the at least one of the temperature of the fuel or the pressure of the fuel to the memory to create at least one of a fuel temperature history or a fuel pressure history. The determining the level of degradation of the fuel actuation system may be further based on the at least one of the fuel temperature history or the fuel pressure history. The method may further comprise: detecting an engine shutdown. The detecting the engine shutdown may include at least one of determining if an aircraft is on the ground, determining if an engine is at ground idle, and determining if an over speed test is successful. The moving the metering valve may include at least one of increasing or decreasing current to a servo valve (SV) for a pre-determined duration. The level of degradation may include at least one of a change in the first travel distance, a change in the pressure of the fuel, or a change in the temperature of the fuel.

An electronic engine control (EEC) may comprise: a controller; and a tangible, non-transitory memory configured to communicate with the controller, the tangible, non-transitory memory having instructions stored thereon that, in response to execution by the controller, cause the controller to perform operations comprising: moving a metering valve from a first position to a second position; detecting a first travel distance of the metering valve; storing the first travel distance of the metering valve to a memory to generate a first travel distance history; and determining a level of degradation of a fuel actuation system based on at least the first travel distance history.

In various embodiments, the instructions may cause the controller to perform operations further comprising: moving the metering valve from the second position to a third position; detecting a second travel distance of the metering valve; storing the second travel distance of the metering valve to the memory to generate a second travel distance history; and determining a level of degradation of the fuel actuation system based on at least one of the first travel distance history and the second travel distance history. The instructions may cause the controller to perform operations further comprising: detecting at least one of a temperature of a fuel or a pressure of the fuel; and storing the at least one of the temperature of the fuel or the pressure of the fuel to the memory to create at least one of a fuel temperature history or a fuel pressure history. The determining the level of degradation of the fuel actuation system may be further based on the at least one of the fuel temperature history or the fuel pressure history. The instructions may cause the controller to perform operations further comprising: detecting an engine shutdown. The detecting the engine shutdown may include at least one of determining if an aircraft is on the ground, determining if an engine is at ground idle, and determining if an overspeed test is successful. The moving the metering valve may include at least one of increasing or decreasing current to a servo valve (SV). The level of degradation may include at least one of a change in the first travel distance, a change in the pressure of the fuel, or a change in the temperature of the fuel.

A fuel actuation system may comprise: a servo valve (SV) including a torque motor and at least one screen; a metering valve (MV) fluidly connected to the SV; and an electronic engine control (EEC) operatively connected to the servo valve. The EEC may be configured and disposed to determine at least one of a travel time of the MV, a travel distance of the MV, a pressure of a fuel, or a temperature of the fuel; store the at least one of the travel time of the MV, the travel distance of the MV, the pressure of the fuel, and the temperature of the fuel to a memory to generate at least one of a travel time history, a travel distance history, a fuel temperature history, and a fuel pressure history; and determine a level of degradation of the fuel actuation system based on the at least one of the travel time history, the travel distance history, the fuel temperature history, or the fuel pressure history.

In various embodiments, the level of degradation may include at least one of a change in the travel time or the travel distance. The level of degradation may include a change in the pressure of the fuel. The level of degradation may include a change in the temperature of the fuel. The travel distance of the MV may be determined by moving the MV for a pre-determined duration.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein. Thus, the detailed description herein is presented for purposes of illustration only and not of limitation. The scope of the disclosure is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials. In some cases, reference coordinates may be specific to each figure.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 1:
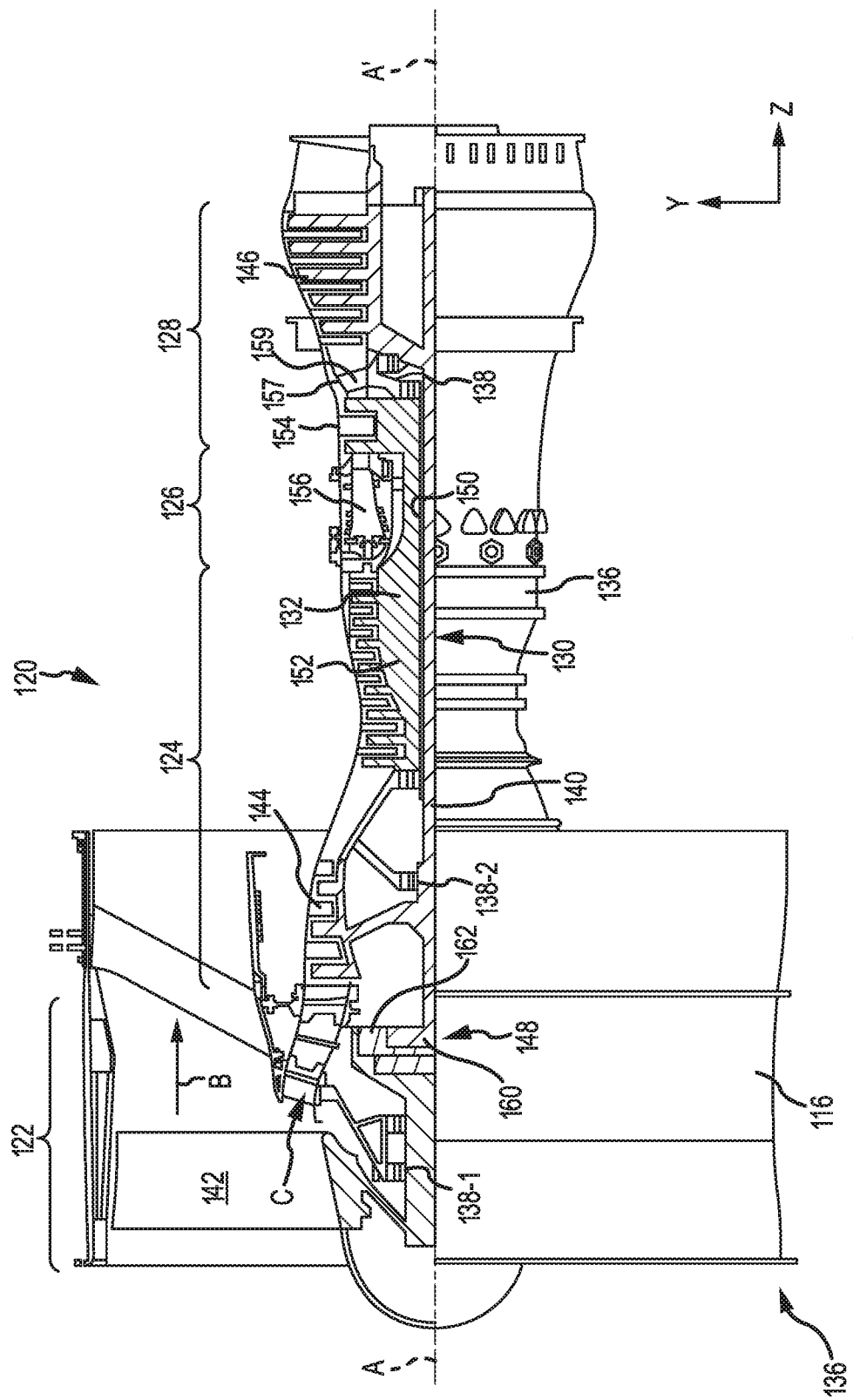
FIG. 1 illustrates an example gas turbine engine, in accordance with various embodiments.

In various embodiments and with reference to FIG. 1, a gas turbine engine 120 is provided. Gas turbine engine 120 may be a two-spool turbofan that generally incorporates a fan section 122, a compressor section 124, a combustor section 126 and a turbine section 128. Alternative engines may include, for example, an augmentor section among other systems or features. In operation, fan section 122 can drive air along a bypass flow-path B while compressor section 124 can drive air along a core flow-path C for compression and communication into combustor section 126 then expansion through turbine section 128. Although depicted as a turbofan gas turbine engine 120 herein, it should be understood that the concepts described herein are not limited to use with turbofans as the teachings may be applied to other types of turbine engines including three-spool architectures.

Gas turbine engine 120 may generally comprise a low speed spool 130 and a high speed spool 132 mounted for rotation about an engine central longitudinal axis A-A' relative to an engine static structure 136 via one or more bearing systems 138 (shown as bearing system 138-1 and bearing system 138-2 in FIG. 1). It should be understood that various bearing systems 138 at various locations may alternatively or additionally be provided including, for example, bearing system 138, bearing system 138-1, and bearing system 138-2.

Low speed spool 130 may generally comprise an inner shaft 140 that interconnects a fan 142, a low pressure (or first) compressor section 144 and a low pressure (or first) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 couples inner shaft 140 to a rotating fan structure. High speed spool 132 may comprise an outer shaft 150 that interconnects a high pressure compressor ("HPC") 152 (e.g., a second compressor section) and high pressure (or second) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and rotate via bearing systems 138 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 144 then HPC 152, mixed and burned with fuel in combustor 156, then expanded over high pressure turbine 154 and low pressure turbine 146. Mid-turbine frame 157 includes airfoils 159 which are in the core airflow path. Low pressure turbine 146 and high pressure turbine 154 rotationally drive the respective low speed spool 130 and high speed spool 132 in response to the expansion.

Figure 2:
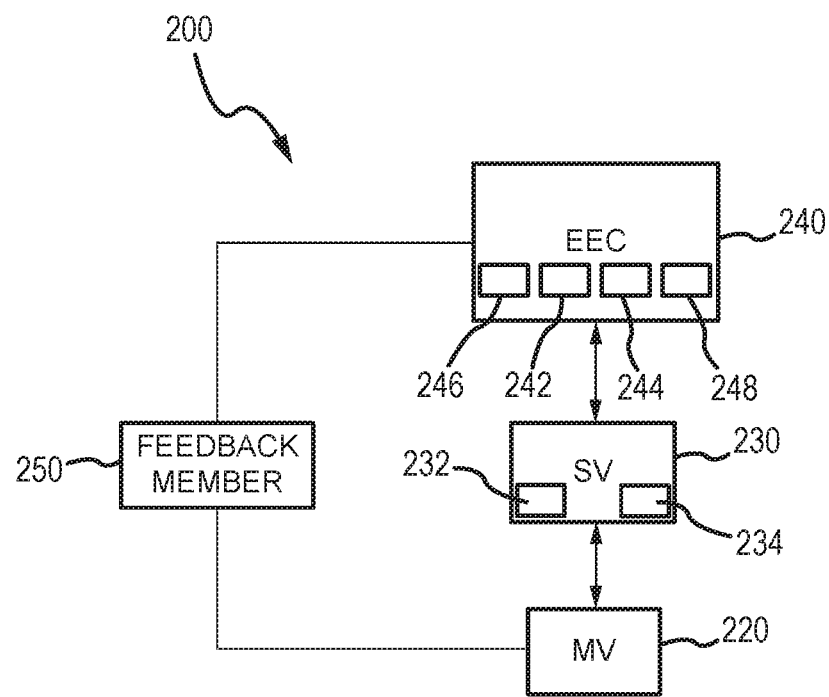
FIG. 2 illustrates a fuel actuation system, in accordance with various embodiments.

In various embodiments and with further reference to FIG. 2, a fuel actuation system 200 is illustrated in accordance with various embodiments. Gas turbine engine 120 may be operatively connected to fuel actuation system 200. Fuel actuation system 200 may include electronic engine control (EEC) 240, servo valve (SV) 230, metering valve (MV) 220, and/or feedback member 250.

In various embodiments, EEC 240, including processing circuitry 242 and memory 244, may control fuel delivery to combustor 156. EEC 240 may be operatively connected to SV 230 having a torque motor 232 that is selectively activated to control fuel delivery to MV 220. In various embodiments, SV 230 may comprise a single stage servo valve. However, SV 230 may comprise any suitable servo valve. SV 230 may be fluidly connected to MV 220. SV 230 may also include one or more screens 234 that prevent contaminate from entering the fuel used to control MV 220. It should be understood that screens 234 may also be located in an adjacent fuel control component. EEC 240 may control torque motor 232 to cause SV 230 to deliver fuel to MV 220 to establish a set point which defines a desired fuel burn flow rate to combustor 156. EEC 240 is shown to include a feedback member 250. Feedback member 250 may provide position feedback from MV 220 to EEC 240. Feedback member 250 may provide temperature feedback from MV 220 to EEC 240. Feedback member 250 may provide pressure feedback from MV 220 to EEC 240. Thus, feedback member 250 may include a temperature sensor, a pressure sensor, and/or a position sensor.

In various embodiments, processing circuitry 142 may include any combination of processing circuits known in the art, such as one or more microprocessors, microcontrollers, digital signal processors, and/or programmable logic devices. The memory 244 may store executable instructions and data to implement control logic of EEC 240. Memory 244 may comprise a tangible, non-transitory storage medium and may store data used, for example, in trending and prognosis purposes. EEC 240 may also include an SV interface 248 that converts data from SV 230 into a format usable by processing circuitry 142 such as a frequency-to-digital converter, for example. EEC 240 may further include a feedback member interface 246 that receives signals from feedback member 250 which provides an indication of MV 220 opening as set by torque motor 232 and also provides a pathway for EEC 240 to control torque motor 232 to set a new valve opening for MV 220. For example, EEC 240 may source a controlled amount of current to torque motor 232 as a metering valve control signal.

In various embodiments, MV 220 is generally actuated or moved via hydraulic or fueldraulic pressure. A hydraulic system, such as a fuel system, may be in fluidic communication with SV 230. Torque motor 232 of SV 230 may receive current from a power source, such as EEC 240 for example, to move a moveable member of SV 230 and in response to the moving, a controlled hydraulic pressure is supplied to MV 220.

Figure 6A:
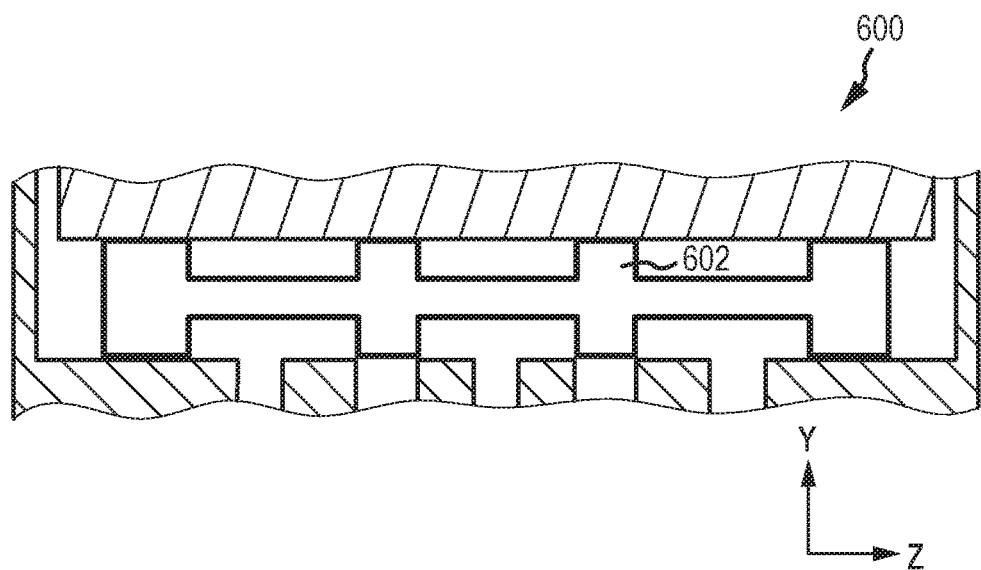
FIG. 6A illustrates a metering valve in a first position, in accordance with various embodiments.

With reference to FIG. 6A, a metering valve 600 is illustrated, in accordance with various embodiments. In various embodiments, metering valve 220 (see FIG. 2) may be similar to metering valve 600. Metering valve 600 may comprise a moveable member 602. Moveable member 602 is illustrated in FIG. 6A in a first position. Although illustrated in FIG. 6A as being in a particular position, the first position of moveable member 602 may any suitable position including a closed or open position.

Figure 6B:
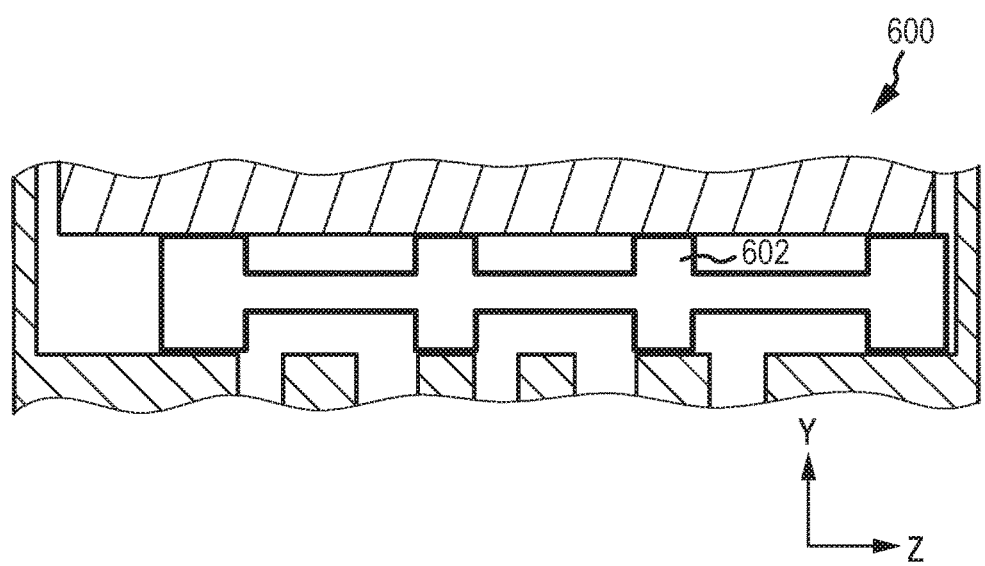
FIG. 6B illustrates a metering valve in a second position, in accordance with various embodiments.

With reference to FIG. 6B, a metering valve 600 is illustrated, in accordance with various embodiments. Moveable member 602 is illustrated in FIG. 6B in a second position. Although illustrated in FIG. 6B as being in a particular position, the second position of moveable member 602 may any suitable position including a closed or open position.

Figure 3A:
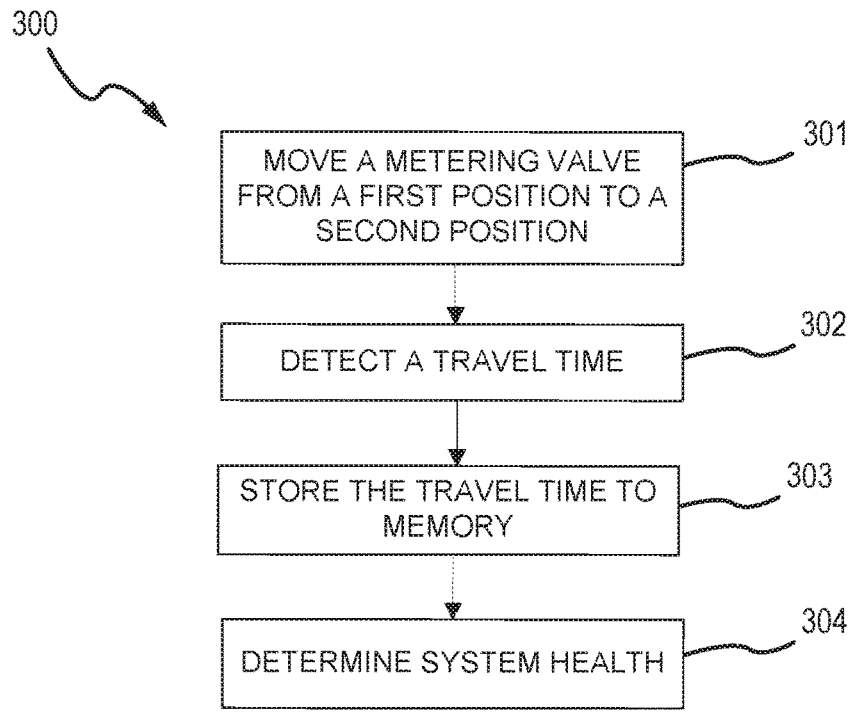
FIG. 3A provides a method for monitoring the health of the fuel actuation system, in accordance with various embodiments.

In various embodiments, with reference to FIG. 2, the health of fuel actuation system 200 may be monitored via EEC 240. System parameters such as time of travel of MV 220, fuel temperature, and fuel pressure may be sensed by feedback member 250 and stored into memory 244. A history of these system parameters may be trended and analyzed by EEC 240 to determine a diagnosis as well as a prognosis of the health of fuel actuation system 200. With further reference to FIG. 3A, a method 300 for monitoring the health of fuel actuation system 200 is provided, in accordance with various embodiments. Method 300 may include moving MV 220 from a first position to a second position (see step 301). MV 220 may be moved via any suitable method. In various embodiments, MV 220 may be moved by increasing or decreasing current supplied to SV 230. In various embodiments, a travel time may be detected when MV 220 is moved from the first position to the second position (see step 302). The travel time may be the total duration of time that it takes for MV 220 to move from the first position to the second position. The travel time may be stored to memory 244 (see step 303). Accordingly, over time, multiple travel times may be stored to memory, thus generating a historical trend of travel times or a travel time history. A controller, such as EEC 240, may determine the health of fuel actuation system 200 based on the travel time history (see step 304). The health of fuel actuation system 200 may be based on a level of degradation of the fuel actuation system 200. The health of fuel actuation system 200 may be based on a level of degradation of the travel time of MV 220.

Figure 3B:
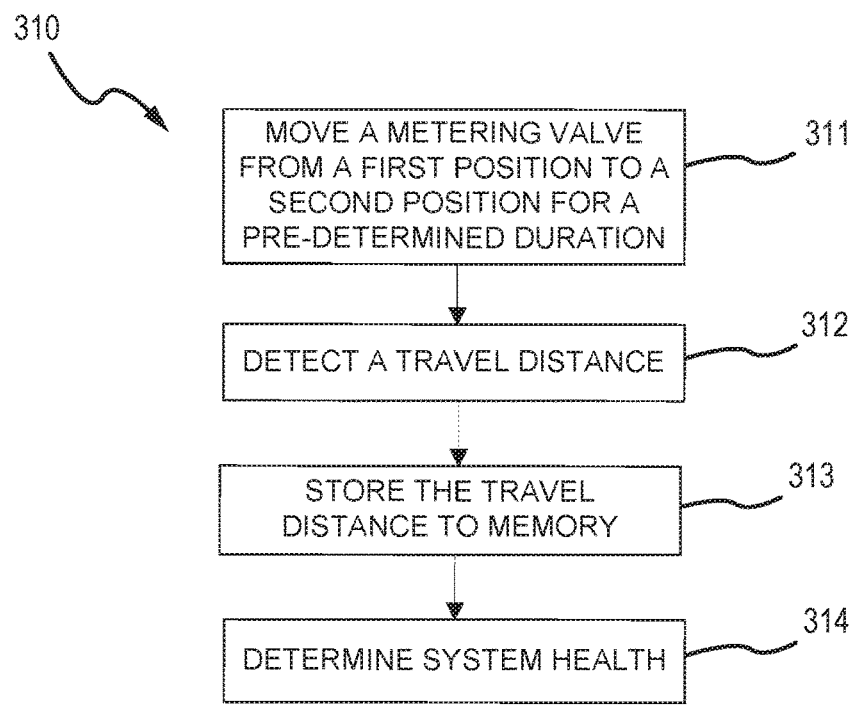
FIG. 3B provides a method for monitoring the health of the fuel actuation system, in accordance with various embodiments.

With further reference to FIG. 3B, a method 310 for monitoring the health of fuel actuation system 200 is provided, in accordance with various embodiments. Method 310 may include moving MV 220 from a first position to a second position for a pre-determined duration (see step 311). MV 220 may be moved via any suitable method. In various embodiments, MV 220 may be moved by increasing or decreasing current supplied to SV 230. In various embodiments, a travel distance may be detected when MV 220 is moved from the first position to the second position (see step 312). The travel distance may be the distance between the first position and the second position. The travel distance may be stored to memory 244 (see step 313). Accordingly, over time, multiple travel distances may be stored to memory, thus generating a historical trend of travel distances or a travel distance history. A controller, such as EEC 240, may determine the health of fuel actuation system 200 based on the travel distance history (see step 314). The health of fuel actuation system 200 may be based on a level of degradation of the fuel actuation system 200. The health of fuel actuation system 200 may be based on a level of degradation of the travel distance of MV 220.

Figure 5:
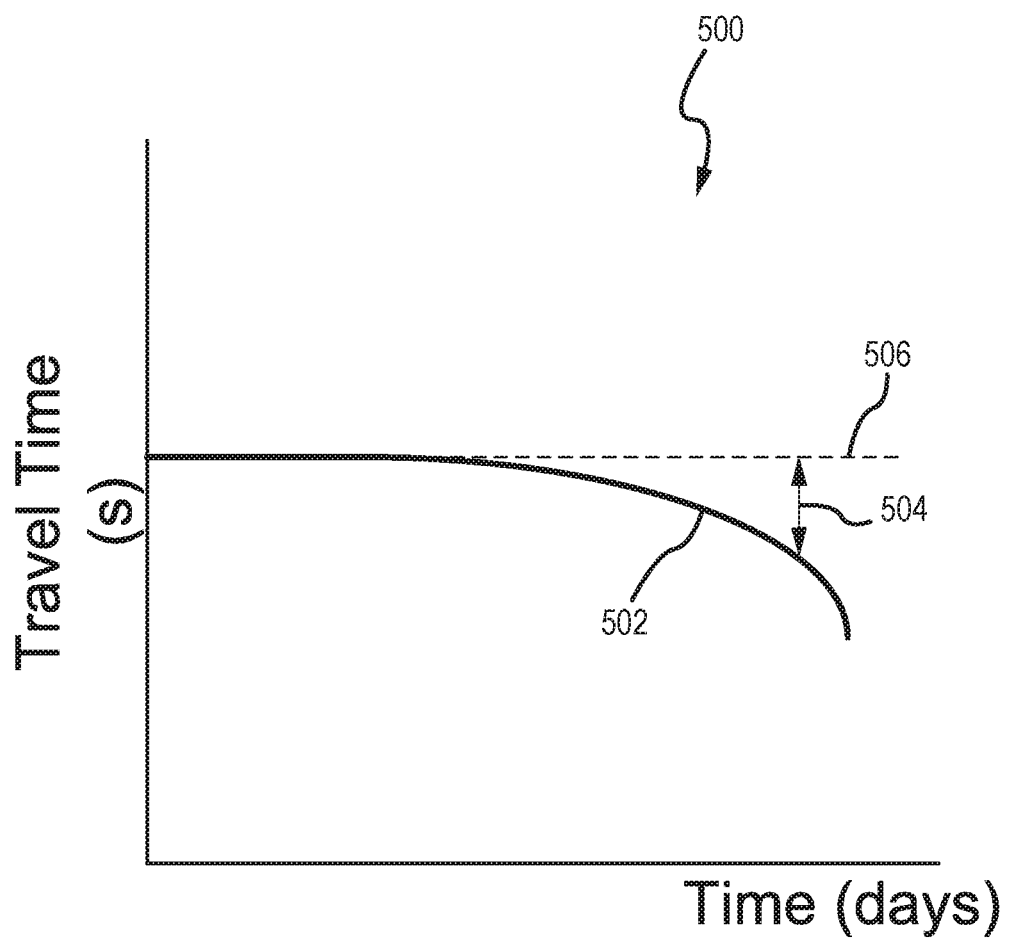
FIG. 5 illustrates a plot of a metering valve travel time vs time, in accordance with various embodiments.

With reference to FIG. 5, a plot 500 of travel time 502 is plotted verses time. Travel time 502 may decrease over time and degradation 504 of travel time 502 may occur. Degradation 504 may be the difference between initial travel time 506 and travel time 502. Thus, degradation 504 may be a change in travel time 502. In various embodiments, degradation 504 may vary over time. In various embodiments, degradation 504 may increase over time. Although some degradation 504 of travel time 502 might be expected, excessive decrease in travel time 502 may indicate poor health of fuel actuation system 200 (see FIG. 2). Accordingly, plot 500 illustrates a travel time history. Although illustrated with respect to travel time, plot 500 may also similarly illustrate a degradation of travel distance over time. Stated another way, travel time may be replaced with travel distance in FIG. 5 to similarly illustrated travel distance in inches or centimeters. In this manner a travel distance history may be created.

Figure 4:
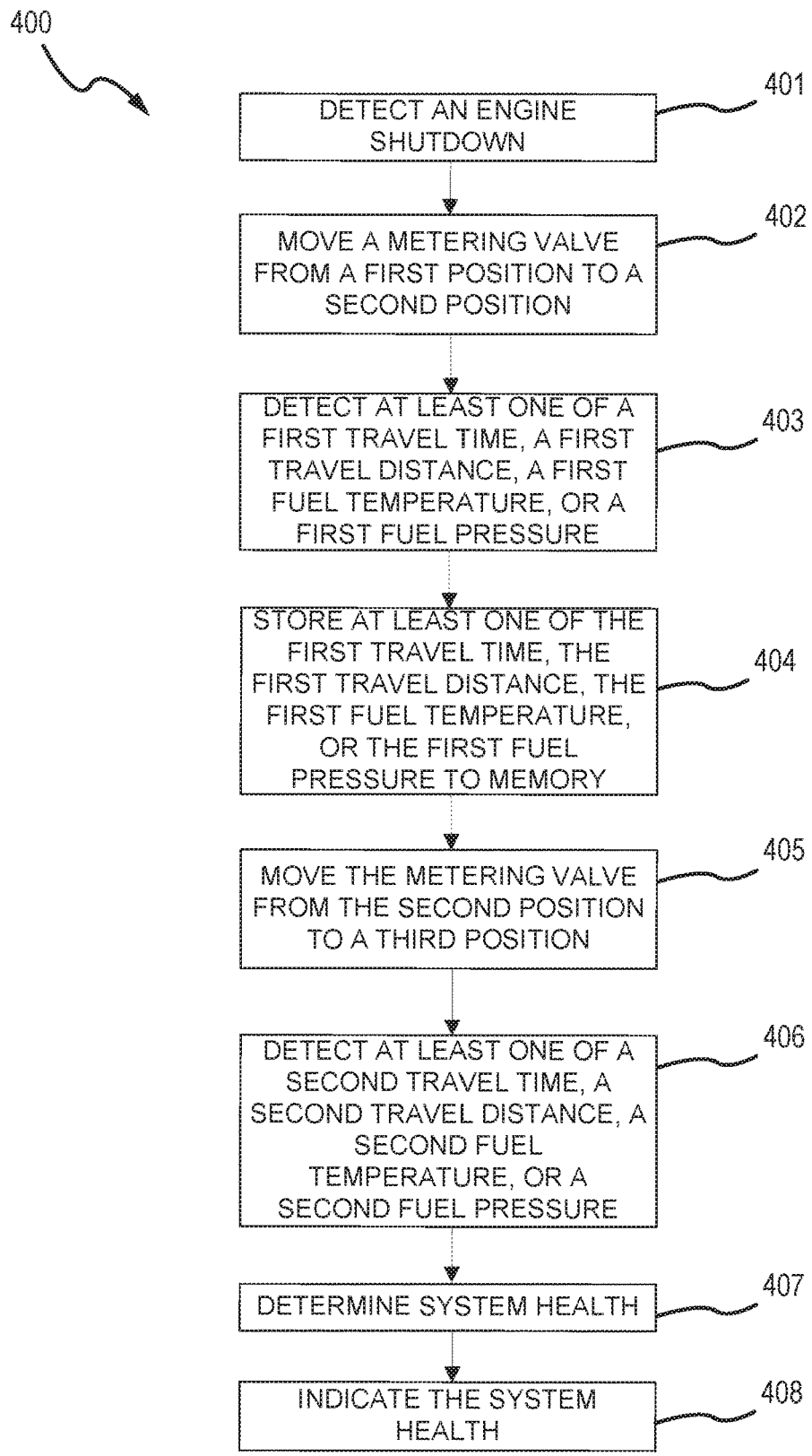
FIG. 4 provides a method for monitoring the health of the fuel actuation system, in accordance with various embodiments.

With reference to FIG. 4, another method 400 for monitoring the health of fuel actuation system 200 is provided. Method 400 may include detecting an engine shutdown (see step 401). Detecting an engine shutdown may include at least one of determining if an aircraft is on the ground, determining if an engine is at ground idle, and determining if an overspeed test is successful. With further reference to FIG. 2, method 400 may include moving MV 220 from a first position to a second position (see step 402). Step 402 may be similar to step 301 (see FIG. 3A) and/or step 311 (see FIG. 3B). At least one of a travel time, a travel distance, a fuel temperature, or a fuel pressure may be detected when MV 220 is moved from the first position to the second position (see step 403). The travel time may be the total duration of time that it takes for MV 220 to move from the first position to the second position. The travel distance may be the distance between the first position to the second position. The fuel temperature may be the temperature of a fuel located in fuel actuation system 200. Fuel temperature may be detected via a temperature sensor of feedback member 250. The fuel pressure may be a pressure of a fuel located in fuel actuation system 200. Fuel pressure may be detected via a pressure sensor of feedback member 250. However, fuel pressure may be determined via any suitable method. The travel time, travel distance, fuel temperature, and/or fuel pressure may be stored to memory 244 (see step 404). Similar to the travel time 502 (see FIG. 5), the travel distance, the fuel temperatures, and the fuel pressures may be stored to memory, thus generating, over time, travel distance trends, fuel temperature trends, and fuel pressure trends, or travel distance history, fuel temperature history, and fuel pressure history. In various embodiments, the MV 220 may be moved from the second position to a third position (see step 405). In various embodiments, the second position may be an open position. In various embodiments, the third position may be a closed position. However, the second position and the third position may comprise any suitable position. At least one of a second travel time, a second travel distance, a second fuel temperature, or a second fuel pressure may be detected when MV 220 is moved from the second position to the third position (see step 406). A controller, such as EEC 240, may determine a level of degradation of the fuel actuation system 200 based on the travel time history and/or the travel distance history. A controller, such as EEC 240, may determine a level of degradation of the fuel actuation system 200 based on the travel distance history in a manner similar to the travel time history. A controller, such as EEC 240, may determine a level of degradation of the fuel actuation system 200 based on the fuel temperature history in a manner similar to the travel time history. A controller, such as EEC 240, may determine a level of degradation of the fuel actuation system 200 based on the fuel pressure history in a manner similar to the travel time history. Accordingly, A controller, such as EEC 240, may determine the health of fuel actuation system 200 (see step 407). In various embodiments, EEC 240 may indicate the determined system health (see step 408). For example, EEC 240 may output a signal to a display to indicate the health of fuel actuation system 200. Such indication may be performed via any suitable indicator such as, for example, a light, a message on a display, text, symbols, etc. For example, EEC 240 may output a signal to a display or other controller to indicate the degradation or health of fuel actuation system 200.

In various embodiments, with reference to FIG. 5, the health of a system may be determined by comparing the degradation 504 of one system, with the degradation of one or more other systems. For example, one system may comprise a degradation which is compared with the average degradation of a group of systems.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for monitoring fuel actuation system health for a gas turbine engine of an aircraft, comprising:
   causing a metering valve to move from a first position to a second position;
   detecting a first travel distance of the metering valve;
   storing the first travel distance of the metering valve to a memory to generate a first travel distance history;
   detecting, via at least one sensor, at least one of a temperature of a fuel or a pressure of the fuel;
   storing the at least one of the temperature of the fuel or the pressure of the fuel to the memory to create at least one of a fuel temperature history or a fuel pressure history;
   tracking, by a controller, a level of degradation of a fuel actuation system or the fuel actuation system health for the gas turbine engine of the aircraft based on the first travel distance history and at least one of the fuel temperature history and the fuel pressure history; and displaying, on a display, an indication of the tracked level of degradation or the tracked health of the fuel actuation system for the gas turbine engine of the aircraft, wherein the indication comprises at least one of a light, a message, text and symbols.

2. The method of claim 1, further comprising:
causing the metering valve to move from the second position to a third position;
detecting a second travel distance of the metering valve;
storing the second travel distance of the metering valve to the memory to generate a second travel distance history;
determining the level of degradation or the health of the fuel actuation system based on at least one of the first travel distance history and the second travel distance history; and
outputting a signal to indicate the level of degradation.

3. The method of claim 1, further comprising detecting an engine shutdown.

4. The method of claim 3, wherein the detecting the engine shutdown includes at least one of determining when the aircraft is on the ground, determining when an engine is at ground idle, and determining when an over speed test is successful.

5. The method of claim 1, wherein the causing the metering valve to move includes at least one of increasing or decreasing current to a servo valve (SV) for a pre-determined duration.

6. The method of claim 1, wherein the level of degradation or the health includes at least one of a change in the first travel distance, a change in the pressure of the fuel, or a change in the temperature of the fuel.

7. An electronic engine control (EEC) for monitoring fuel actuation system health for a gas turbine engine of an aircraft, comprising:
a controller; and
a tangible, non-transitory memory configured to communicate with the controller, the tangible, non-transitory memory having instructions stored thereon that, in response to execution by the controller, cause the controller to perform operations comprising:
commanding a metering valve to move from a first position to a second position;
detecting a first travel distance of the metering valve;
storing the first travel distance of the metering valve to the tangible, non-transitory memory to generate a first travel distance history
detecting, via at least one sensor, at least one of a temperature of a fuel or a pressure of the fuel;
storing the at least one of the temperature of the fuel or the pressure of the fuel to the tangible, non-transitory memory to create at least one of a fuel temperature history or a fuel pressure history;
tracking a level of degradation or the health of a fuel actuation system based on the first travel distance history and at least one of the fuel temperature history and the fuel pressure history; and
displaying, on a display, an indication of the tracked level of degradation or the tracked health of the fuel actuation system for the gas turbine engine of the aircraft, wherein the indication comprises at least one of a light, a message, text and symbols.

8. The EEC of claim 7, wherein the instructions cause the controller to perform operations further comprising:
commanding the metering valve to move from the second position to a third position;
detecting a second travel distance of the metering valve;
storing the second travel distance of the metering valve to the tangible, non-transitory memory to generate a second travel distance history; and
determining a level of degradation or the health of the fuel actuation system based on at least one of the first travel distance history and the second travel distance history.

9. The EEC of claim 7, wherein the instructions cause the controller to perform operations further comprising detecting an engine shutdown.

10. The EEC of claim 9, wherein the detecting the engine shutdown includes at least one of determining when the aircraft is on the ground, determining when an engine is at ground idle, and determining when an over speed test is successful.

11. The EEC of claim 7, wherein the commanding the metering valve to move includes at least one of increasing or decreasing current to a servo valve (SV).

12. The EEC of claim 7, wherein the level of degradation or the health includes at least one of a change in the first travel distance, a change in the pressure of the fuel, or a change in the temperature of the fuel.

\* \* \* \* \*